United States Patent Office 2,931,845
Patented Apr. 5, 1960

2,931,845

PREPARATION OF RUBBER-PROTEIN-GLYOXAL COMPOSITION AND VULCANIZABLE MATERIAL OBTAINED THEREFROM

Rene Leon Lehmann, Bernard Joseph Petusseau, and Christian Pierre Pinazzi, Paris, France, assignors to Nobel Bozel (Societe Anonyme), Paris, France, a company of France No Drawing. Application June 24, 1957
Serial No. 667,699

Claims priority, application France July 2, 1956

4 Claims. (Cl. 260—747)

It is known that it is possible to obtain rubber-resin compounds from latex and thus to obtain reinforced rubbers, that is to say vulcanisation products with improved mechanical properties. To this end the latex may be stabilised against the effect of coagulation by acids, then there are added, in acid medium, the constituents of a resin formed in acid medium. Reinforced resins may also be mixed with ordinary latex, that is to say with colloidal dispersions of rubber: more or less pre-condensed aldehyde resins are introduced into the latex. In this case the rubber-resin compound obtained has the same properties as a reinforced rubber, but the reinforcing effect of the resin disappears entirely under the action of a kneader; the physico-chemical system is therefore not stable. To conserve the properties of a reinforced rubber, and to utilise it for the manufacture of moulded objects, it must be subjected to gelation in a mould, followed by drying and vulcanisation.

According to the present invention, by the treatment of latex in an alkaline medium there are obtained new rubber-resin compounds which are resistant to the action of the kneader and are capable of having, in addition, certain complementary mechanical properties.

The process according to the invention consists firstly in utilising an animal or vegetable protein as a constituent of the resin, in incorporating such a protein in an aqueous dispersion of rubber so as to form with it a homogeneous fluid medium and in treating with a reticulating agent, such as an aldehyde. The condensation with the aldehyde therefore commences within a latex in which the protein has been introduced previously in the non-precondensed state in the form of a solution or colloidal dispersion. There is thus obtained a rubber-protein-aldehyde compound which, after kneading and vulcanisation, has the properties of an excellent reinforced rubber.

The aqueous dispersion of rubber may be a dispersion of natural rubber or synthetic rubber. Different natural rubber latices may be used and in particular Heveatex in its different forms. The rubber content of the dispersion may be high, medium or low; there may also be used, in particular, the residual latex of concentration or "skim latex."

As proteins there may be used animal or vegetable proteins such as milk casein, gelatin and fibrin, protein extracts of soya, peanut, maize or algae, polypeptides, which may be synthetic etc.

The reticulating agents may be monoaldehydes, such as formaldehyde, or polyaldehydes, such as glyoxal, alone or mixed with other mono- or polyfunctional aldehydes.

To carry into effect the process according to the invention, there is first prepared a solution or a colloidal dispersion of the protein, for example by placing it in aqueous solution in the form of alkali proteinate. Into this solution there is mixed an aqueous dispersion of rubber, for example in the form of natural or artificial latex. Any concentrations may be used; in practice a latex solution having a concentration comprised, for example between 15 and 70% would be used. An aldehyde is then added, for example formaldehyde or glyoxal, and it produces a condensation reaction with or without the separation of gel according to the concentrations. The product of the reaction, which is present in the form of a gel or a solution, is separated, for example by causing flocculation by introduction into a dilute solution of acetic acid. The product is then washed and dried. Finally it may be kneaded and vulcanised like known rubber base products. The incorporation of the vulcanisation ingredients takes place on a kneader, as is common practice. Any process of vulcanisation may be used, for example that which consists of adding the following ingredients (mentioned in their order of introduction) per 100 g. of dry rubber:

3 g. of stearic acid.
5 g. of zinc oxide.
1 g. of "MTBZ" (mercapto benzothiazole, zinc salt).
1 g. of Ionol (2.6 ditertiary-butyl-4-methyl phenol).
0.8 g. of Santocure (benzothiazole cyclohexyl sulphenamide).
2 g. of sulphur.

It has also been found that if a polyaldehyde, such as glyoxal, is used as the reticulation agent, either alone or mixed with other mono- or polyfunctional aldehydes, there is obtained a more profoundly modified rubber-protein-aldehyde compound; after kneading and vulcanisation, there is indeed a notable improvement of the hydrophobic and thermo-resistance tests of the materials obtained.

Although the invention is not to be related to any hypothesis or tentative explanation it is presumed that within the latex the glyoxal reacts in two stages on the proteinaceous matter and the rubber:

In the first stage, in alkaline medium the glyoxal becomes attached to the amino groups of the proteinaceous material; methylol groups appear; compounds of the type:

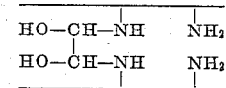

are obtained by the action of the glyoxal:

on the polypeptidic chains:

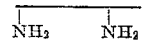

In the second stage, in acid medium, the methylol groups disappear as a result of the progression of the reticulation; there results the disappearance of the hydrophily and the obtaining of a molecular unit of reinforced structure and very high thermo-resistance. In this second stage, the following two groups of reactions may take place:

(a) condensation of the methylol proteins with the elimination of water; for example

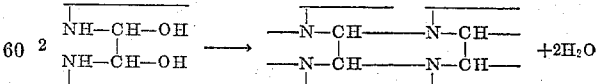

(b) substitutionary addition reactions—of the Holmberg reaction type—between the molecules of the methylol proteins and the molecules of rubber; for example

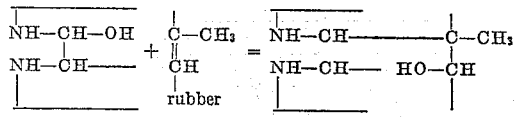

These reactions commence in acid medium and end probably during the course of the vulcanisation.

The reaction of the glyoxal with the protein thus contributes a means of fixing the latter chemically on the rubber.

The maximum reinforcement of the rubber by the proteins and the glyoxal appears generally with well defined amounts of glyoxal. With natural rubber latex and casein, for example, the optimum proportions of glyoxal are from 1 to 5% with respect to the casein. Larger or smaller proportions lead to a decrease of the mechanical properties.

The speed and the intensity of the reaction of the glyoxal on the proteinate, in alkaline medium (first stage), are favoured, up to a certain limit, by the concentration of the protein solution employed. In the case of casein, generally it is suitable, in practice, to have in the reaction medium a proportion of casein/water (total) of about 1:7 to 1:10.

For the reaction in acid medium, a pH of from 3.5 to 4.5 is very favourable, since below this value there is a risk of the hydrolysis reactions of the proteins becoming too important.

At ambient temperature, in acid medium, the latex-casein-glyoxal mixtures evolve rather slowly; a maturing is necessary to obtain vulcanisation products possessing the mechanical properties of a good reinforced rubber. An increase of the temperature considerably accelerates this reaction. It becomes possible, for example, to obtain satisfactory mixtures at the end of an hour by heating to 100° C.

The washing of the flocculates must be effected with care. In fact the excess of glyoxal must be eliminated with the object of avoiding secondary reactions in the course of the vulcanisation.

The flocculate may be filtered by any known means. The washing may be effected very simply, for example, with a large amount of water, until the mass is neutral to pH indicator paper.

Generally speaking, the rubber-aldehyde-protein compounds according to this invention show an exceptional resistance to chemicals, definitely higher than that of rubber and other known elastomers.

Some examples will now be given of the practical realisation of the invention, it being understood that these examples are given for the sake of clarity of the description and do not import any limitation to the invention.

Example 1

60% natural rubber latex is vigorously stirred into lactic casein, previously dissolved to the extent of 11% in ammonia water containing 6% of commercial ammonia solution at 22° Bé. In the homogeneous fluid medium obtained, which contains 15 parts of casein to 100 parts of latex, formaldehyde is then introduced, with continued stirring, to the extent of 4% with respect to the casein. There is produced a reaction which ends in the formation of a gel. This gel is allowed to mature for several hours, then it is dispersed under vigorous stirring, in an 8% aqueous solution of acetic acid, in quantity necessary to provoke flocculation. It is then filtered, washed and dried. There is thus obtained a master mixture which, after kneading and vulcanisation, has the following mechanical properties compared with a test sample without casein:

|  | Sample without casein | With 15% casein |
|---|---|---|
| Modulus, Kg./cm.$^2$: |  |  |
| at 200% | 15 | 56 |
| at 300% | 25 | 101 |
| at 500% | 60 | 227 |
| Breaking strength, Kg./cm.$^2$ | 250 | 271 |
| Maximum extension, percent | 600 | 560 |
| Tearing strength, Kg./cm. (Association Française de Normalisation) | 30 | 76 |
| Shore hardness | 40 | 61 |

Example 2

In this example the formaldehyde is replaced by glyoxal, of which 2% is used with respect to the casein. With the exception of this difference, the technique of preparation is identical with that described in the preceding example. The following mechanical properties are obtained compared with a test sample without casein:

|  | Sample without casein | With 15% casein |
|---|---|---|
| Modulus, Kg./cm.$^2$: |  |  |
| at 200% | 15 | 69 |
| at 300% | 25 | 105 |
| at 500% | 60 | 254 |
| Breaking strength, Kg./cm.$^2$ | 250 | 281 |
| Maximum extension, percent | 600 | 560 |
| Tearing strength, Kg./cm. | 30 | 80 |
| Shore hardness | 40 | 61 |

The product obtained according to Example 2, with casein-glyoxal, presents a resistance to heat and a water repellency which are superior to those of the casein-formol product obtained according to Example 1. Numerical examples of the improvements obtained by the presence of glyoxal are given hereinafter.

A sample of the rubber-formaldehyde-casein compound produced according to this example was immersed in benzene; after twenty-four hours, a swelling index (reckoned as weight increase) of 171 percent was found. Under the same conditions, the swelling index of ordinary para rubber was 204 percent.

Another sample was exposed to the action of moist chlorine; after 8 days, the weight increase was 68 mg. per square centimeter of exposed surface. Under the same conditions, the weight increase for ordinary para rubber amounted to 91 mg. per square centimeter.

Example 3

Great dilution is employed in this example: 60% natural rubber latex is stirred into lactic casein, previously dissolved to the extent of 5% in ammonia water containing 2% of commercial ammonia solution at 22° Bé. In the homogeneous fluid medium obtained, which contains 15 parts of casein to 100 parts of latex, glyoxal is introduced, with continued stirring, to the extent of 2% with respect to the casein. Maturing is allowed for several hours without the formation of a gel, then the product of reaction is introduced into an 8% acetic acid solution in quantity necessary to provoke flocculation. The flocculate obtained is filtered, washed and dried. There is thus obtained a master mixture which, after kneading and vulcanisation has the following properties compared with a sample without casein:

|  | Sample without casein | With 15% casein |
|---|---|---|
| Modulus, Kg./cm.$^2$: |  |  |
| at 200% | 15 | 52 |
| at 300% | 25 | 92 |
| at 500% | 60 | 203 |
| Breaking strength, Kg./cm.$^2$ | 250 | 239 |
| Maximum extension, percent | 600 | 500 |
| Tearing strength, Kg./cm. | 30 | 70 |
| Shore hardness | 40 | 64 |

The product obtained according to Example 3, with casein-glyoxal, presents a resistance to heat and a water repellency which are superior to those of the casein-formol product obtained according to Example 1. If for example increasing loads are applied to identical cylinders of the two vulcanised products in boiling water, it is found that the extensions in the case of the casein-formol are always greater, for the same load than those obtained in the case of casein-glyoxal:

| Loads | Extension | |
|---|---|---|
| | Example 1— Casein-formol | Example 3— Casein-glyoxal |
| | Percent | Percent |
| 100 g. | 50 | 10 |
| 300 g. | 75 | 20 |
| 500 g. | 115 | 65 |
| 4,500 g. | 1,000 | 620 |

Example 4

Preparation of a white rubber with titanium oxide from a natural rubber latex:

The procedure for the preparation of the mixture is as in Example 1.

The mixture obtained is mixed with the following ingredients per 100 g. of dry rubber of the latex:

| | |
|---|---|
| Stearic acid | 1 |
| Zinc oxide | 5 |
| Ionol (2.6-ditertiary-butyl-4-methyl phenol) | 1 |
| Mercaptobenzimidazolate of zinc | 1 |
| Santocure (cyclohexyl - 2 - benzothiazole sulphenamide) | 0.8 |
| Sulphur | 2 |
| Titanium oxide | 5 |

After kneading and vulcanisation there is obtained a good white rubber having the following characteristics:

| | |
|---|---|
| Breaking strength, kg./cm.$^2$ | 226 |
| Modulus at 300%, kg./cm.$^2$ | 106 |
| Maximum extension, percent | 480 |

Example 5

Preparation of a translucent rubber from a natural rubber latex:

The procedure for the preparation of the mixture is as in Example 1.

The mixture obtained is mixed with the following ingredients per 100 g. of dry rubber of the latex:

| | |
|---|---|
| Stearic acid | 1 |
| Ionol | 1 |
| Mercaptobenzimidazolate of zinc | 1 |
| Santocure | 0.8 |
| Sulphur | 2 |
| Active zinc oxide (B.G. 150) | 1 |

After kneading and vulcanisation there is obtained a good translucent rubber having the following characteristics:

| | |
|---|---|
| Breaking strength, kg./cm.$^2$ | 200 |
| Modulus at 300%, kg./cm.$^2$ | 94 |
| Maximum extension, percent | 485 |

Example 6

Preparation of reinforced rubber from synthetic rubber GRS-4, i.e. a synthetic rubber known as "Government Rubber Styrene No. 4" and being a butadiene-styrene copolymer obtained by copolymerizing 75 parts by weight of butadiene with 25 parts by weight of styrene in aqueous emulsion.

90 g. of casein are placed in dispersion in 410 g. of water at 60° C. There are added, with stirring, 20 cm.$^3$ of ammonia at 22° Bé. and the temperature and stirring are maintained for about 15 minutes. This solution is then poured into 600 g. of a latex (45% dry matter) of synthetic rubber "GRS-4." It is allowed to cool to ambient temperature and there are added, with stirring, 36 cm.$^3$ of glyoxal in a 10% aqueous solution. A gelation is produced rapidly. The mixture is left for 24 hours, then it is treated with a 10% acetic acid solution until a pH of about 4 is obtained. It is raised to boiling for 1 hour with gentle stirring. After cooling, the flocculate obtained is filtered, carefully washed and then dried at 50° C.

For the vulcanisation the following ingredients are added per 100 g. of dry rubber of the latex:

| | |
|---|---|
| Stearic acid | 1 |
| Zinc oxide | 5 |
| Ionol | 1 |
| Mercaptobenzimidazolate of zinc | 1 |
| Santocure | 1.2 |
| Sulphur | 3.5 |

There is obtained a reinforced rubber having the following characteristics:

| | |
|---|---|
| Breaking strength, kg./cm.$^2$ | 189 |
| Modulus at 300%, kg./cm.$^2$ | 177 |
| Shore hardness | 70 |

What is claimed is:

1. A process for the production of a vulcanizable, robbery product which comprises: mixing together an alkaline dispersion of a protein in an aqueous solution of ammonia and a rubber latex having a dry material content of between 15% and 70% by weight; said protein being selected from the group consisting of milk casein, gelatin, fibrin and vegetable proteins and said latex being selected from the group consisting of natural rubber latices and latices which are aqueous emulsions of the artificial rubber which is the copolymerization product of butadiene with styrene in the proportion by weight of 75:25; the relative proportions of protein: dry rubber: water being between 300 and 400 parts by weight of dry rubber per 100 parts by weight of protein and between 700 and 1000 parts by weight of water, per 100 parts by weight of protein; stirring into the alkaline mixture so proportioned, between 1% and 5% by weight of glyoxal, based on the weight of protein in said mixture; then adding acetic acid to the resulting composition to lower the pH of the composition to between 3.5 and 4.5, and thereby producing a rubbery flocculate product; separating the said flocculate product and washing the separated flocculate with water to neutrality.

2. The process of claim 1 which further comprises heating said mixture at 100° C. for an hour after said addition of acetic acid thereto and before separating said flocculate.

3. The vulcanizable, rubbery product obtained by the process of claim 1.

4. A process for the production of a vulcanizable rubbery product which comprises: mixing together an alkaline dispersion of casein in an aqueous solution of ammonia and a natural rubber latex having a dry material content of between 15% and 70% by weight; the relative proportions of casein: dry rubber: water being between 300 and 400 parts of dry rubber per 100 parts of casein by weight and between 700 and 1000 parts of water per 100 parts of casein by weight; stirring into the alkaline mixture so proportioned, between 1% and 5% by weight of glyoxal based on the weight of casein in said mixture; then adding acetic acid to the resulting composition to lower the pH of the composition to between 3.5 and 4.5 and thereby producing a rubbery flocculate product; separating the said flocculate and washing the separated flocculate with water until neutral.

References Cited in the file of this patent

UNITED STATES PATENTS

| 1,929,544 | Woodruff | Oct. 10, 1933 |
| 2,056,958 | Coughlin | Oct. 13, 1936 |
| 2,127,298 | Isaacs | Aug. 16, 1938 |
| 2,335,405 | Geer | Nov. 30, 1943 |
| 2,453,752 | La Piana et al. | Nov. 16, 1948 |
| 2,775,565 | McKinney et al. | Dec. 25, 1956 |

OTHER REFERENCES

Walker: Formaldehyde, 2nd edition, published by Reinhold Publishing Co., 1953, pages 312–17.